United States Patent [19]
Heiling

[11] 4,094,576
[45] June 13, 1978

[54] STRAIGHT-LINE OPTICAL SCANNER USING ROTATING HOLOGRAMS

[75] Inventor: Gerald Michael Heiling, Pine Island, Minn.

[73] Assignee: International Business Machines Corporation, Armonk, N.Y.

[21] Appl. No.: 790,720

[22] Filed: Apr. 25, 1977

Related U.S. Application Data

[63] Continuation-in-part of Ser. No. 673,183, Apr. 2, 1976, abandoned.

[51] Int. Cl.² .................. G02B 5/32; G02B 27/17; G03H 1/04
[52] U.S. Cl. ......................................... 350/3.71; 350/6.1
[58] Field of Search ............................. 350/3.5, 6, 7

[56] References Cited

U.S. PATENT DOCUMENTS

| | | | |
|---|---|---|---|
| 3,619,033 | 11/1971 | McMahon | 350/3.5 |
| 3,721,487 | 3/1973 | Pieuchard et al. | 350/7 |
| 3,795,768 | 3/1974 | Locke | 350/3.5 |
| 3,922,059 | 11/1975 | Noguchi | 350/3.5 |
| 3,922,060 | 11/1975 | Oosaka et al. | 350/3.5 |
| 3,940,202 | 2/1976 | Kato et al. | 350/3.5 |
| 3,953,105 | 4/1976 | Ih | 350/7 |
| 4,026,630 | 5/1977 | Wollenmann | 350/3.5 |

*Primary Examiner*—Ronald J. Stern
*Attorney, Agent, or Firm*—J. Michael Anglin

[57] ABSTRACT

A flat disk contains a number of holograms made from the interference of a plane wavefront with spherical wavefront modified by a first cylindrical lens. The disk is rotated so that a plane reconstruction wavefront sweeps across the holograms. The resulting reconstructed wavefront is passed through a second cylindrical lens, resulting in a focussed point sweeping across an object surface in one or more substantially straight lines.

16 Claims, 8 Drawing Figures

U.S. Patent June 13, 1978 Sheet 3 of 3 4,094,576
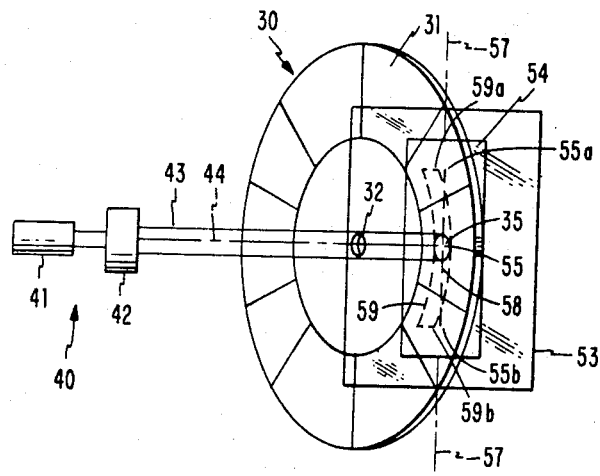
FIG. 7
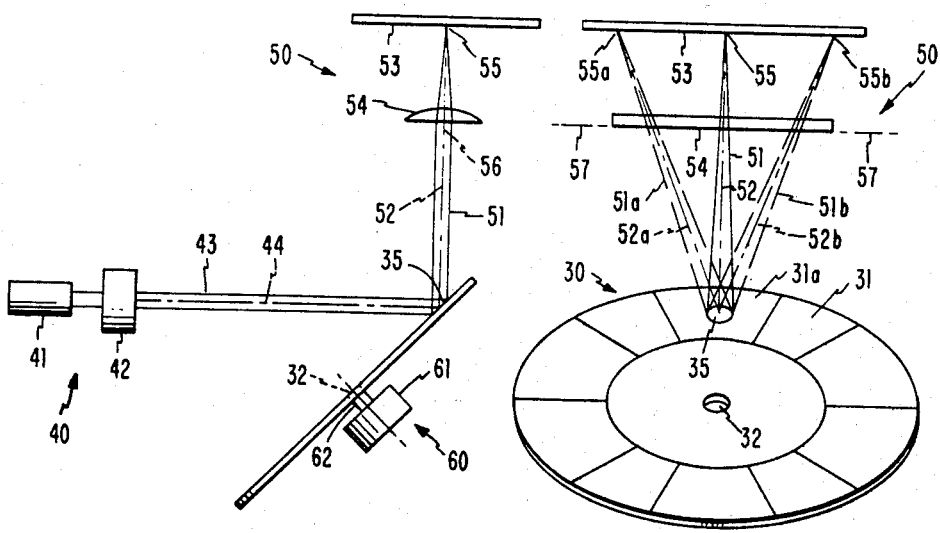
FIG. 5
FIG. 6

STRAIGHT-LINE OPTICAL SCANNER USING ROTATING HOLOGRAMS

RELATION TO OTHER APPLICATIONS

This application is a continuation-in-part of application Ser. No. 673,183, filed Apr. 2, 1976, by G. M. Heiling, now abandoned.

BACKGROUND OF THE INVENTION

The present invention concerns optical systems wherein a light beam is deflected by the displacement of an element containing an interference pattern.

Many fields of technological endeavor use optical scanners to convert object outlines, bar codes, printed characters and the like to electrical signals for analysis or transmission. The single most common scan pattern for such applications is one or more straight lines which are focussed in a substantially flat object surface.

The prior art shows that simple, inexpensive and rugged optical scanners can be realized by rotating an optical interference pattern through a light beam from a coherent source, such as a laser. But conventional systems lose these inherent advantages in the process of constructing a complete, practical scanner system. Commonly assigned application Ser. No. 643,891, filed Dec. 23, 1975, by Pole, et al, for example, requires a strongly curved object surface. In many cases, of course, the object cannot be curved in this way; for example, where a bar code on a solid package is to be read. Commonly assigned application Ser. No. 644,679, filed Dec. 23, 1975, by Wollenmann, now U.S. Pat. No. 4,026,630, is capable of producing a scan pattern lying in a plane, but the individual lines of the pattern are curved within this plane. Although such curves may be made to approximate straight lines, other constraints on the scanner may preclude the achievement of sufficient accuracy. There are also rotating-hologram scanners whose geometry permits the generation of substantially straight-line scan patterns. Examples of such systems are shown in U.S. Pat. Nos. 3,619,033 to McMahon, 3,721,487 to Pieuchard, et al, 3,795,768 to Locke, 3,922,059 to Noguchi, 3,922,060 to Oosaka, et al and 3,940,202 to Kato, et al. Each of these systems, however, is inherently physically large, complex and/or requires precise adjustments.

SUMMARY OF THE INVENTION

The present invention overcomes the above and other disadvantages of conventional optical scanners, and provides a scanner which approximates straight-line scans without sacrificing the basic simplicity of the rotating-hologram scanner.

Briefly, the present invention uses a flat disk having holograms containing interference patterns resulting from a planar reference wave and a spherical wave modified by a first cylindrical lens. To produce the scan pattern, the disk is rotated while a planar reconstruction beam is projected onto the holograms. The resulting reconstructed wave is transmitted through a second cylindrical lens at an angle to the first lens.

DRAWINGS

FIGS. 5–7 are side, front and top views of a scanner according to the present invention.

DETAILED DESCRIPTION

Figure 1:
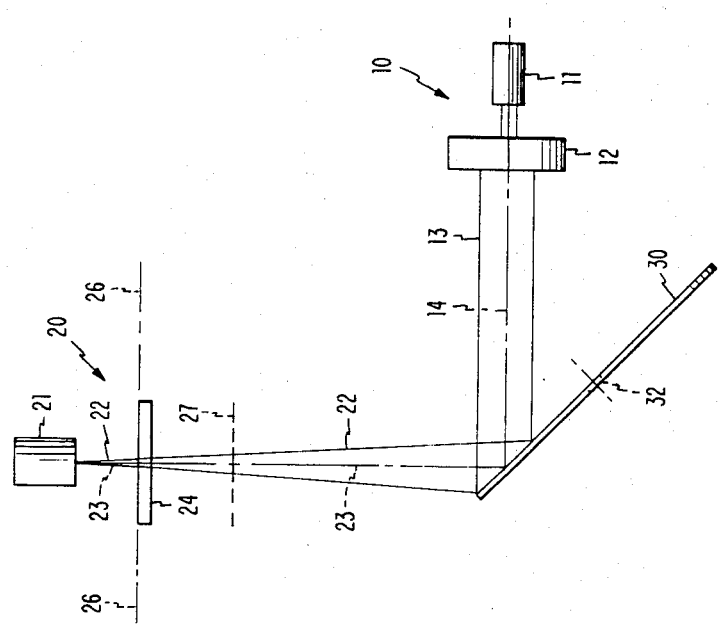
FIGS. 1 and 2 are side and front views of apparatus for preparing holographic interference patterns useful in the present invention.
Figure 2:
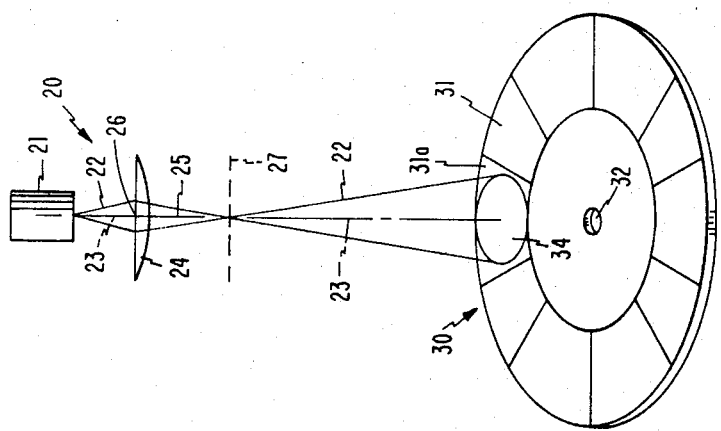

FIGS. 1 and 2 show side and front views of a simplified apparatus for producing holographic interference patterns useful in the present invention.

A first light source 10 includes a conventional laser 11 and beam expander 12 for producing a phase-coherent plane-wave reference beam 13. Axis line 14 denotes the center of this beam. For the sake of clarity, source 10 has been omitted from FIG. 2.

A second light source 20 includes optics 21 for emitting a coherent point-source or spherical-wave object beam 22 along an axis 23. Beam 22 has the same frequency as beam 13, and is most conveniently obtained therefrom by a beam splitter or other conventional optics (not shown). A cylindrical lens 24 has its optical axis 25 coincident with axis 23, and its cylindrical axis 26 perpendicular thereto. By way of establishing a reference, axis 26 may be said to be in a first direction parallel to axis 14, FIG. 1. Lens 24 focuses beam 22 to a line image lying in an object plane indicated by dashed line 27. This focal line has a direction in the plane of FIG. 1, and out of the plane of FIG. 2. Below line 27, beam 22 expands as a coherent cylindrical wave-front. Any other conventional sources of coherent plane and cylindrical wave-fronts may be substituted for the particular sources 10 and 20 shown in FIGS. 1 and 2.

Lens 24 should have a large focal length; i.e., the distance between lens 24 and surface 27 should be as large as large as possible. The upper limit on this distance is primarily imposed by the desired spot size, as in conventional practice. That is, the maximum focal length $f$ for a given desired spot size $d$ is $f = (\pi/4)(da/\lambda)$, where $a$ is the aperture size and $\lambda$ is the wavelength of the light used.

Beams 13 and 22 intersect on a medium comprising a glass disk 30 which carries a photographic emulsion capable of recording holograms. Disk 30 is divided into a number of annular segments 31 about its center 32. Disk 30 is placed so that reference beam 13 and object beam 22 intersect on the surface of one segment 31a. Disk 30 is tilted so that axes 14 and 23 form equal angles with its surface. Although these axes are preferably also approximately perpendicular to each other (i.e., about 45° from the plane of disk 30), other angles are useful as well. It is also preferred, but not necessary, that sources 10 and 20 lie on the same side of disk 30. For the sake of clarity, the area 34 over which the beams intersect is shown as less than the full extent of segment 31a. Preferably, however, the entire area of the segment is exposed to both beams, while the remaining segments are shielded therefrom by conventional means (not shown).

Figure 3:
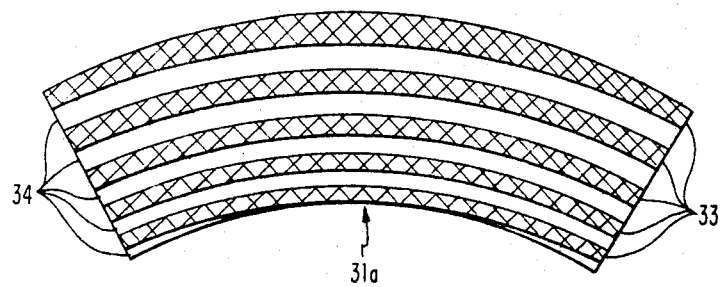
FIG. 3 is a highly simplified representation of an interference pattern obtained from the apparatus of FIGS. 1 and 2.

FIG. 3 is a highly exaggerated illustration of a transmission hologram created in sector 31a by exposure of the photographic emulsion thereon to plane reference wave 13 and cylindrical object wave 22, FIGS. 1 and 2. The resulting microscopic interference pattern comprises a series of alternating opaque arcs 33 and transparent arcs 34. The widths of these arcs decrease monotonically toward the center 32 of disk 30, as the angle between the rays of wave-fronts 13 and 22 increases.

When lens axis 25 is coincident with beam axis 23, arcs 33 and 34 are circular and concentric, although with a radius different from that of disk 30. In other cases, to be described herein-below, arcs 33 and 34 assume more complex shapes. The holographic interference pattern is fixed in segment 31a by developing the photographic emulsion in any conventional manner.

The purpose of the apparatus shown in FIGS. 1 and 2 is to produce holograms containing the interference patterns of the type shown in FIG. 3. Any other apparatus capable of producing the same interference patterns would serve equally well in the present invention.

Figure 4:
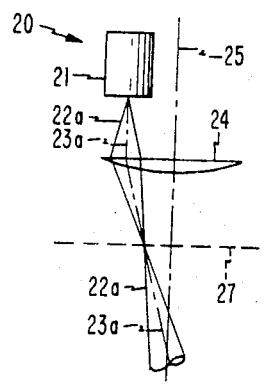
FIG. 4 shows a modification to FIG. 2.

The remaining segments 31 of disk 30 may be exposed in exactly the same manner as segment 31a, or may be copied therefrom. If all segments 31 are identical to each other, the scanner to be described in connection with FIGS. 5-7 will generate multiple raster scan lines overlying each other on object plane 27. One scan line will be produced for each segment containing an interference pattern; such a scanner may use as many or as few segments as desired. In many applications, however, it is desirable to produce multiple raster lines which are laterally offset from each other; i.e., a two-dimensional raster of parallel lines. FIG. 4 illustrates how this effect may be achieved. If object beam 22 is moved so that axis 23a is offset from optical axis 25, lens 24 produces a line image which still lies in plane 27, and which is parallel to but offset from its intersection with optical axis 25. Beam 22a may then be projected onto another of the segments 31 to create another holographic interference pattern with plane-wave reference beam 13, FIG. 1. Additional holograms may be produced by stepping the distance between axes 23a and 25 in the same manner.

The holographic interference patterns on segments 31 need not be exposed directly onto the segments; they may, for example, be made on separate negatives and printed onto the segments. Also, photosensitive media other than photographic emulsions may be employed. Moreover, any means which produces the same interference patterns may be substituted for the particular apparatus shown in FIGS. 1 and 2. The only essential requirement is to produce an optical transformation of a plane-wave for use in a scanner which will now be described.

FIGS. 5, 6 and 7 show side, front and top views of a scanner according to the invention. Light source 40 (omitted from FIG. 6 for clarity) uses a laser 41 and beam expander 42 to produce a plane-wave reconstruction beam 43 along an axis 44. Source 40 is similar to source 10 except that the diameter of beam 43 is much smaller than that of beam 13.

Depending upon the resolution required for a particular application, the diameter of beam 43 would commonly be from about 1 percent to about 10 percent of the segment length; i.e., the distance from one segment 31 to the next.

Source 40 is positioned such that beam 43 strikes segment 31a at the same angle to the plane of disk 30 as that of beam 13, FIG. 1. The hologram on segment 31a thereby produces in a receiver 50 a reconstructed beam 51 having an axis 52 extending in the same direction as axis 23 of object beam 22, according to well known holographic principles. Since the original "object" used to make the hologram was a line, beam 51 would, without more, recreate an image of this line at an object surface 53, which is the same distance from the surface of disk 30 as was plane 27. The focal surface of beam 51 is actually slightly curved, because beams 51a, 52b, 51c, etc., all focus at an equal distance from point 35 on disk 31. Object surface 53 is preferably positioned far enough from point 35 that depth of field is not critical, and beam 51 remains substantially in focus at all points even if surface 53 is a plane. This is easily achieved if, for example, the total angle between beams 51a and 51b is on the order of 10° or less. For all practical purposes, surface 53 may be considered to be flat, and it will be referred to as the object plane.

To convert this line to a point for scanning purposes, another cylindrical lens 54 focuses beam 51 to a point 55 on object plane 53. Lens 54 has an optical axis 56 coincident with beam axis 52, and has a cylindrical axis 57 parallel to object plane 53, but extending in a second direction perpendicular to axis 26 of the cylindrical lens 24 shown in FIGS. 1 and 2. Also, lens 54 is positioned between disk 30 and plane 53, while the first lens 24 was positioned above plane 27. Expressed another way, the focal lines of cylindrical lenses 24 and 54 both lie in substantially the the same surface (27 or 53), but their directions are perpendicular to each other in that surface.

In order to sweep point 55 across object plane 53 in a scan line, means 60 rotates disk 30 about its center 32. Means 60 may comprise a conventional constant-speed motor 61 having a shaft 62 fitted to disk 30. As disk 30 rotates about center 32, the intersection 35 of beam 43 therewith will sweep from one edge of segment 31a to the other. When intersection 35 is near one edge of segment 31a, the diffraction pattern on the segment causes reconstructed beam 51a to follow axis 52a to point 55a on object surface 53, as shown in FIG. 6. As segment 31a moves to the position shown in FIG. 6, the solid-line beam 51 follows axis 52 to point 55, approximately at the center of the scan line. As segment 31a moves farther, so that intersection 35 is at the opposite edge, the reconstructed beam moves to the position shown in dotted lines at 51b, following axis 52b to point 55b on object surface 53. The exact focal points of this beam follow a line which is slightly curved in the plane of FIG. 6, since the lengths of all the axes between 51a and 51b are the same. In scanners of practical proportions, such as in the next paragraph, this curvature is not significant.

The points between 55a and 55b in FIG. 6 form a scan line 58 shown in FIG. 7. Dashed outline 59 in FIG. 7 shows the path of beam 51 at the level of cylindrical lens 54 in FIGS. 5 and 6, as beam 51 sweeps along scan line 58. At that level, path 59 is curved away from axis 57. Cylindrical lens 54, however, redirects these off-axis rays back toward axis 57 so that the resulting scan line 58 is straight rather than curved. Scan 58 will retain a small amount of residual curvature in the direction of path 59. Such aberrations may be minimized by the use of a short focal length for lens 54, and moving the lens away from disk 31. That is, it is desirable to have a large ratio between the total length of reconstructed beam 51 (i.e., the distance from beam intersection 35 to object plane 53) and the focal length of lens 54 (i.e., the distance from this lens to object surface 53). Ratios greater than 10:1, or even 20:1 for very high accuracy, are preferred. The effects of the remaining curvature may be minimized by the use of a large focal length for cylindrical lens 24, as described hereinabove, to provide a large depth of field. An object (not shown) may then be placed at object plane 53, shown herein to be a transparent scan window, and may be scanned in a straight line.

Figure 8:
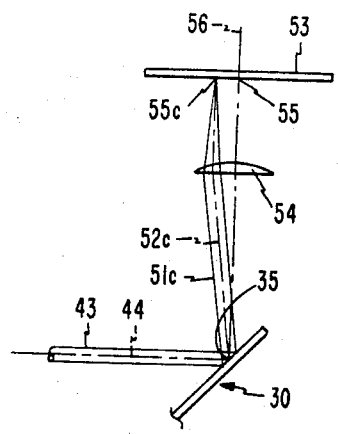
FIG. 8 shows a variation of FIG. 5.

In FIG. 4, it was shown that beam 22a could be displaced from axis 25 to produce a laterally offset line image or focal line at plane 27. FIG. 8 shows the resulting offset scan in a partial side view taken from FIG. 5. In FIG. 8, reconstructed beam 51c, centered about axis 52c, is at an angle to lens axis 56. These off-axis rays are refracted to a focus at point 55c, which is still within object plane 53. As disk 30 rotates through the segment 31 containing the appropriate hologram made according to FIG. 4, point 55c executes a straight-line scan across plane 53 in a direction out of the paper in FIG. 8, and parallel to the original scan through point 55. Thus, the present scanner is capable of producing a two-dimensional straight-line raster scan over an object located at plane 53. As discussed in connection with FIG. 4, any number of laterally offset scan lines may be produced, depending upon the number of different interference patterns recorded on segments 31.

I claim as my invention:

1. A method for producing straight-line optical scan patterns, comprising the steps of:
    (a) projecting a collimated coherent optical reference beam onto an area of a sensitized medium;
    (b) projecting a spherical object beam onto said area through a first cylindrical lens having a first focal line extending in a first direction in an object plane, so as to produce an optical interference pattern in said area;
    (c) developing said medium, so as to fix said interference pattern in said area;
    (d) projecting a collimated coherent reconstruction beam onto said medium, so as to generate a reconstructed beam converging toward a line image in said object plane;
    (e) transmitting said reconstructed beam through a second cylindrical lens having a second focal line extending in a second direction in said object plane; and
    (f) imparting rotary relative motion between said medium and said reconstruction beam.

2. A method according to claim 1, wherein said second direction is perpendicular to said first direction.

3. A method according to claim 2, wherein said medium comprises a flat disk having a photographic emulsion on at least an annular segment thereof.

4. A method according to claim 2 comprising the further step of repeating steps (a) and (b) for further areas of said medium, so as to produce a plurality of interference patterns in an annulus on said medium.

5. A method according to claim 4, comprising the further step of displacing said object beam for each repetition of steps (a) and (b), so as to produce line images of said object beam at different positions in said object plane for different repetitions.

6. A method according to claim 5, wherein said object beam is displaced in a direction perpendicular to said first direction, so as to produce a sequence of mutually parallel line images in said object plane.

7. A method according to claim 1, wherein said reference beam and said object beam lie on the same side of said medium, and form substantially equal angles therewith.

8. A method according to claim 7, wherein said equal angles are approximately 45°.

9. A method according to claim 1, wherein the focal length of said first cylindrical lens is substantially the maximum for the desired spot size.

10. An optical scanner for producing straight-line scans, comprising:
    a disk having an annulus containing a number of optical interference patterns representing interactions between a plane reference wave and a cylindrical object wave having a cylindrical axis extending in a first direction in an object plane;
    a light source for projecting a plane reconstruction wave upon said annulus so as to produce a reconstructed wave forming an image of said object wave;
    a cylindrical lens having a cylindrical axis extending in a second direction perpendicular to said first direction, for focussing said reconstructed wave to a point in said object plane; and
    means for rotating said disk, so as to move said point in a plurality of straight lines as said interference patterns move relative to said reconstruction wave.

11. A scanner according to claim 10, wherein said interference patterns occupy contiguous segments around said annulus.

12. A scanner according to claim 11, wherein different ones of said interference patterns represent object waves having different, noncollinear cylindrical axes.

13. A scanner according to claim 11, wherein the width of said reconstruction beam is less than about 10% of the widths of said contiguous segments.

14. A scanner according to claim 10, wherein said reconstruction beam and said cylindrical lens lie on the same side of said disk.

15. A scanner according to claim 14, wherein said cylindrical lens has an optical axis intersecting said disk at an angle equal to the angle between said disk and said reconstruction wave.

16. A scanner according to claim 10, wherein the total length of said reconstructed beam is at least ten times the focal length of said cylindrical lens.

* * * * *